United States Patent [19]

Kramer et al.

[11] 4,412,665
[45] Nov. 1, 1983

[54] 3-WHEELED LEVERED TRAILING BEAM LANDING GEAR

[75] Inventors: Louis T. Kramer; Franklin H. Butler, both of Long Beach; Donald C. Callas, Fullerton, all of Calif.

[73] Assignee: McDonnell Douglas Corporation, Long Beach, Calif.

[21] Appl. No.: 317,005

[22] Filed: Nov. 2, 1981

[51] Int. Cl.³ .............................................. B64C 25/10
[52] U.S. Cl. ............................................... 244/102 R
[58] Field of Search ........... 244/100 R, 102 R, 102 A, 244/102 SL, 103 R, 104 R

[56] References Cited

U.S. PATENT DOCUMENTS

| | | | |
|---|---|---|---|
| 2,630,990 | 3/1953 | Kanode et al. | 244/102 SL |
| 3,038,687 | 6/1962 | Hartel | 244/102 R |
| 3,198,461 | 8/1965 | Beach | 244/102 R |
| 3,323,761 | 6/1967 | Copeland | 244/102 R |
| 3,432,124 | 3/1969 | Lucien | 244/103 R |
| 3,974,988 | 8/1976 | Whitworth | 244/103 R |
| 4,328,939 | 5/1982 | Davies et al. | 244/102 R |

FOREIGN PATENT DOCUMENTS 941109  3/1956  Fed. Rep. of Germany ... 244/102 R

*Primary Examiner*—Galen L. Barefoot
*Attorney, Agent, or Firm*—Paul T. Loef; George W. Finch; Donald L. Royer

[57] ABSTRACT

A three wheeled, generally in line, articulated landing gear with the lever trailing the lever hinge axis, applied in a pair. Each shock strut, axle, and rolling assembly counter twist 90° upon retraction about a laterally offset post to present the smallest frontal area or pod size. The twisting mechanism, the door links and the over center down lock are all tied mechanically to the gear so that no other sequencing is required during gear retraction or extension.

13 Claims, 6 Drawing Figures

3-WHEELED LEVERED TRAILING BEAM LANDING GEAR

BACKGROUND OF THE INVENTION

This invention relates to a 3-wheeled, generally in-line, articulated landing gear with the lever trailing the lever hinge axis and, more particularly, an aircraft landing gear in which the entire rolling assembly, including the shock strut, twists 90° upon retraction.

Design of an aircraft main landing gear is a compromise between many conflicting requirements, thus limiting near optimum selection to a small number of the total elements required. Fundamentally, an inventor must select between a telescopic leg and an articulated levered unit and also determine whether the gear is in the stowed position is to be contained within the loft lines of the normal fuselage or a pod or blister outside the normal loft lines. The conflicting requirements include wheel flotation, turning complexity, gear retraction, landing behavior, backing and braking, stability, free fall, pod drag, weight, maintenance, cost, reliability, and how the gear integrates with the aircraft structure. Aircraft having a requirement to land and take off from airstrips having a low bulk modulus of elasticity, which produce high drag loads, suggest a levered suspension unit landing gear with a trailing beam, as it provides greater resiliency. Gear stowage inside or outside the normal fuselage loft line is generally determined by the vertical clearance available for stowage which is often dictated by the floor location. Judicious trade-off of many elements is required to produce a combination which functions as a satisfactory main gear.

Generally, it is axiomatic that the fewer tires per gear pattern, the more efficient each tire. Of course, this must be balanced against maximum wheel size as determined by other criteria.

There are no known applications in cargo or commercial aircraft where three generally aligned wheels are used on a single strut. However, there is a military airplane, the SR71 and its associated models which use three wheels in line. In the SR71, the strut structure is a fork type which straddles the center wheel with another wheel on either side which is supported by a cantilevered axle. The center wheel is inaccessible and clearly distinguishable over the present invention.

Prior art landing gears have rotated and folded upon retraction, used laterally offset posts, and have mechanically synchronized the various kinematics. It is the unique combination of these features in a single landing gear along with the new axle beam arrangement, which makes this landing gear distinguishable over the prior art.

It is an object of this invention to provide a landing gear with a highly efficient wheel arrangement to provide superior wheel flotation for application with low bulk modulus of elasticity landing strips yet providing good turning ability without main gear steering while providing excellent landing stability. It is a further object of this invention to provide a retracting mechanism which provides for stowage in a minimum sized pod external to the normal fuselage line which results in minimum aerodynamic drag and yet provide a gear capable of free falling in the event of loss of the main gear actuator.

It is yet another object of this invention to provide a landing gear where all the wheels are readily removable and their brakes are readily accessible.

SUMMARY OF THE PRESENT INVENTION

In summary, the landing gear of this invention accomplishes the above objects and overcome the disadvantages of the prior devices while providing a unique 3-wheeled, generally in-line, articulated landing gear with the lever trailing the lever hinge axis. The unique axle beam arrangement permits good wheel accessability while maintaining a common lever hinge axis for all three wheels, yet employing a single shock strut for all three wheels. The shock strut, axle, and rolling assembly twist 90° upon retraction about a laterally offset post to present the smallest frontal area or pod size. The twisting mechanism, the door links, and the over center down lock are all tied mechanically to the gear so that no other sequencing is required during gear retraction or extension. The landing gear of this invention provides wheel geometry which produces very good wheel flotation, acceptable scrubbing of the wheels while turning, and yet provides concise stowage in a low-drag pod.

BRIEF DESCRIPTION OF THE DRAWINGS

With reference to the drawings, wherein like reference numerals designate like portions of the invention.

DESCRIPTION OF THE PREFERRED EMBODIMENT

Figure 4:
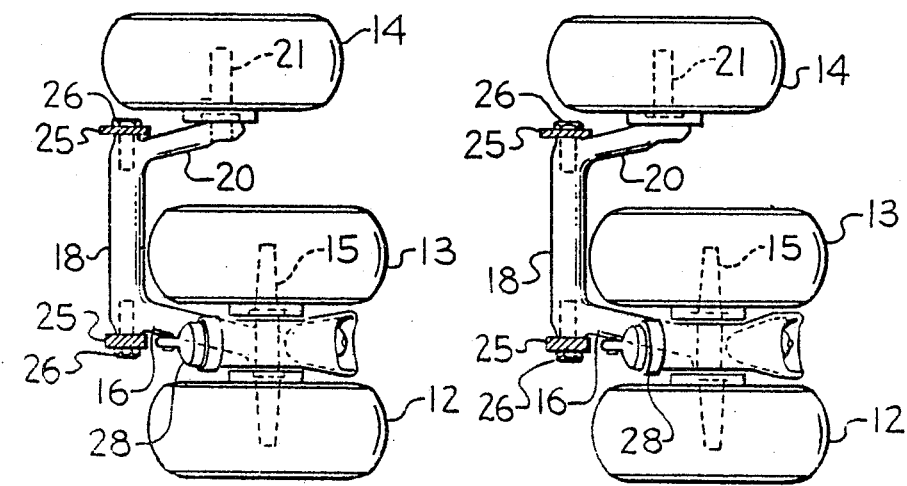
FIG. 4 is a view of the landing gear assembly with the entire upper mechanism removed so as to show the wheel assemblies, the axle beam and the shock strut.

The aft strut assembly 10 combines with the forward assembly 11, which are identical to each other except for the location of the twisting link 55, the retract cylinder 65 and the post lower support 38, to form the total landing gear assembly. Each strut assembly 10 or 11, has an outboard wheel 12, a center wheel 13 and an inboard wheel 14. The outboard and center wheels 12 and 13, are connected by a first axle 15 (best shown in FIG. 4). Supporting the first axle 15 is the trailing lever portion 16 of the axle beam 18. The other end of the axle beam 18 terminates in a second trailing lever portion 20 followed by a stub axle 21 which in turn supports the inboard wheel 14. Of course, the wheel and axle contains the brake, shown in reference at 22, but their design is conventional and they have been omitted for purposes of clarity.

Figure 1:
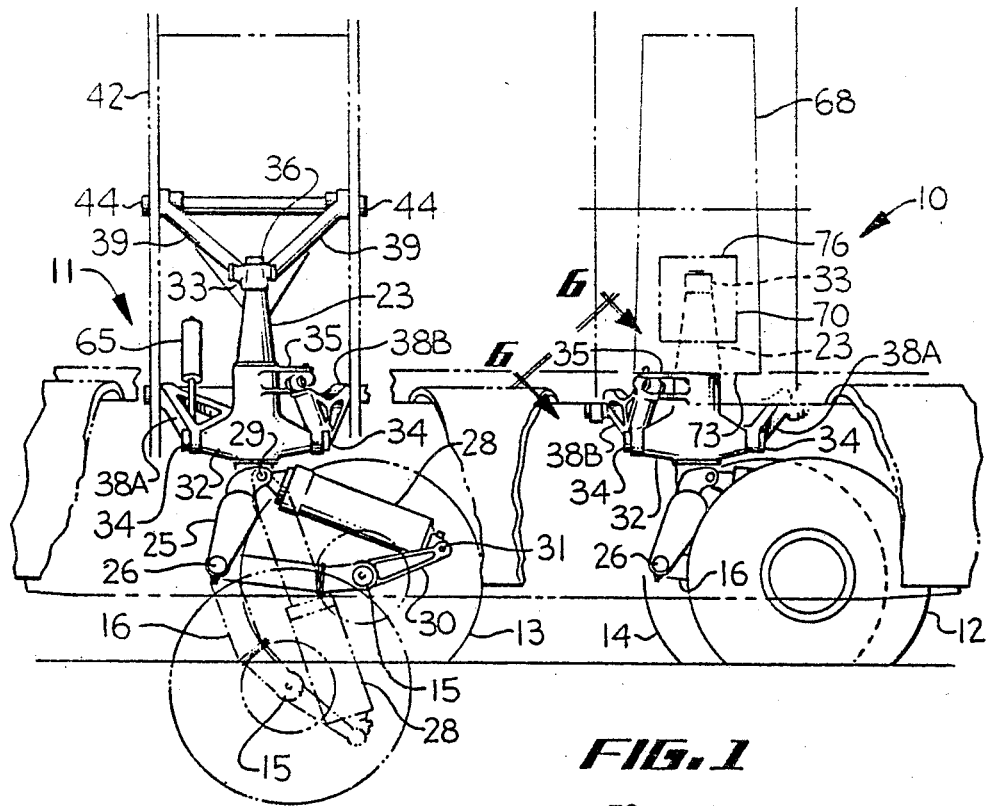
FIG. 1 is a side view of the complete landing gear assembly with part of the upper landing gear door removed for clarity as well as the outboard wheel in the forward strut assembly to better show the shock strut.

The lower portion of the post 23 terminates in a yoke 25 which is pivotally attached at either end to the axle beam 18 by the fasteners 26 which permits rotation of the axle beam 18 about its longitudinal axis between the two trailing levers 16 and 20. All wheels rotate about the same lever hinge axis. The upper end of the outboard portion of the yoke 25 supports the piston end of the shock strut 28 at 29. The trailing lever 16 has an extension portion 30 best seen in the forward assembly 11 of FIG. 1. The cylinder end of the shock strut 28 attaches to the trailing lever extension 30 at 31. The wheel axles 15 and 21 rotate about the centerline of the long axis portion of the axle beam 18, which is attached to the yoke 25, by extending the shock strut 28 as shown in the forward strut assembly 11 of FIG. 1. This view shows the alternate positions of full extension of the shock strut 28 in reference lines and the full retract position of the shock strut 28 in solid lines.

This trailing lever and shock strut arrangement allows about 37% greater vertical movement or displacement of the wheels over the displacement of the shock strut. Large vertical displacement of the extended gear is very important as the principal purpose of any landing gear is to change the direction of motion of the aircraft at landing from a downward glide to one parallel to the ground. The greater vertical displacement allows for a higher rate of descent upon contacting the runway.

Above the yoke 25 is the post 23 which is supported in the trunion collar 32 and the upper collar 33 to provide bearings to permit rotation of the post 23 about its longitudinal axis. Of course, this allows for rotation of the yoke portion 25 which is integral with the post 23 and supports the three wheels 12, 13 and 14 and the axle beam 18. The trunion collar 32 terminates in a pair of opposing trunions 34 near one end and a clevis 35 on the other end. The trunion collar 32 has a through bore which aligns with a bore in the upper collar 33, both of which support the post 23 in bearings to permit rotation. The post 23 is axially restrained by the nut 36.

Figure 2:
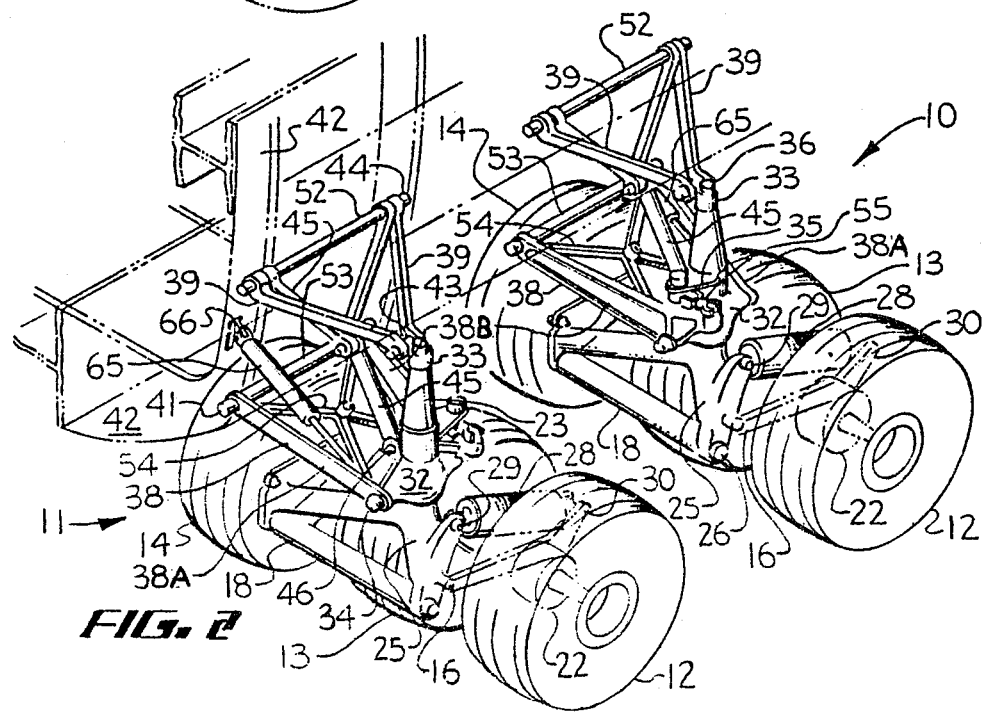
FIG. 2 is an isometric view of the complete landing gear.
Figure 3:
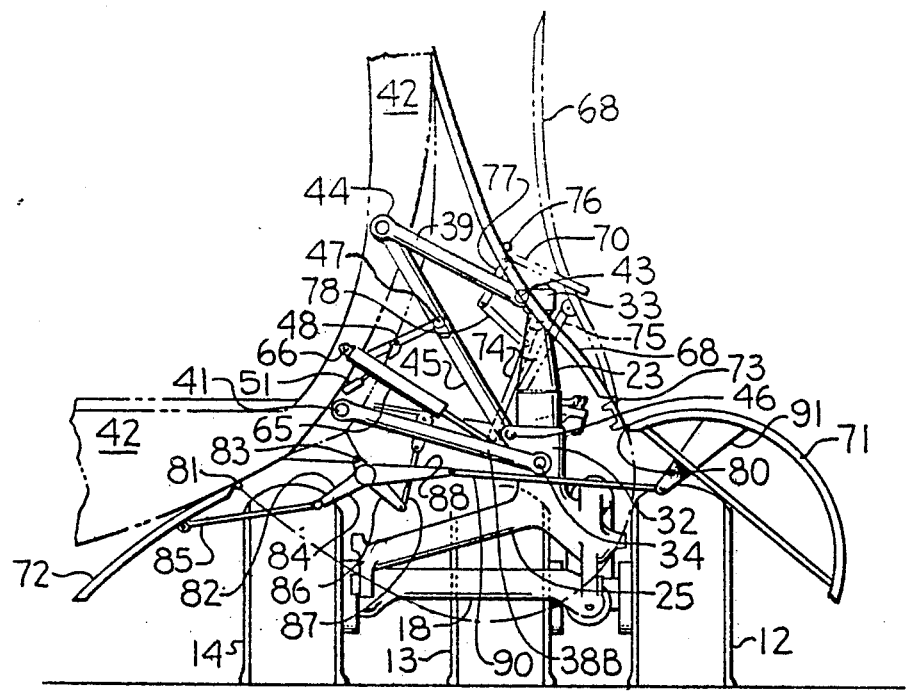
FIG. 3 is a view looking aft of the rear most strut assembly.

It should now be reasonably obvious that the shock strut, axles, and the entire rolling assembly, is supported by the two collars 32 and 33 via the post 23. The two collars 32 and 33 are in turn supported to the structure by a four-bar linkage. The four-bar linkage consists of the lower brace 38, one end of which is pinned to the trunion 34 and the other end is pinned to the aircraft structure 42 at 41. The opposing link in the four-bar linkage is the upper brace 39 which is pin connected to the upper collar 33 at 43 and the aircraft structure 42 at 44. The four-bar linkage, most readily observable in FIG. 3, consists of the link 38, a link formed by the structure between points 41 and 44, link 39 and the distance between the two pins 43 and 34 supplied by the collar 33 and trunnion 32 as spaced by the post 23. The linkage is completed by the folding link 45 connected between pins 44 and 46 on the trunnion collar 32. The actuating linkage was explained, for simplicity, as a two-dimensional linkage in FIG. 3. It should be clear, from observing FIG. 2, that it is clearly three-dimensional with each link having a complimentary mating link spaced apart by the upper spacer bar 52 and the lower spacer bar 53. The lower brace 38 has two complementary links 38A and 38B which combine to form the lower brace 38 which is further reinforced by a cross brace 54. The folding link 45 is pin connected at 47 which is also the hinge point for the folding link 45 and the connection point for one end of the over center down lock link 48. The other end of the over center lock link 48 is connected to structure and the lock links are normally hydraulically operated by an actuator shown at 51. The lock links are biased by a spring back up (not shown) for down latching during an emergency free fall. The actuator 51 must be capable of working against the biasing spring.

Figure 6:
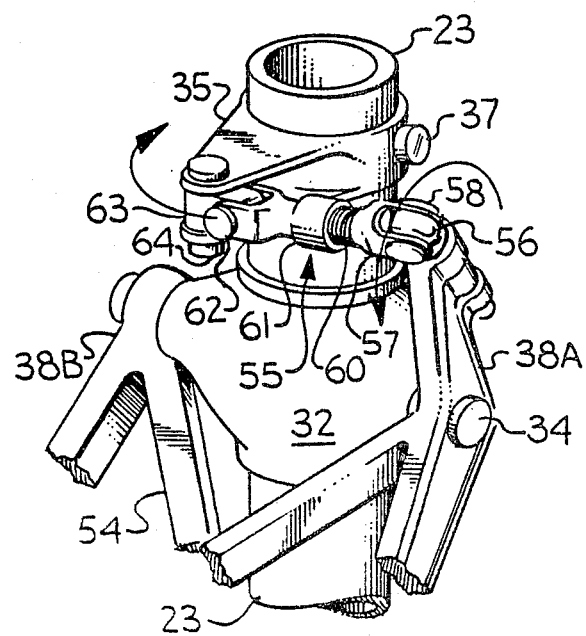
FIG. 6 is an enlarged partial view taken at 6—6 in FIG. 1 to better show the twister link and its attachment to the offset post.

Links 38A and 38B are not exactly identical as 38A supports the one end of the twister link 55 which is best observed in FIG. 6. Connected to one end of the lower link 38A is the ball end 56 which is free to rotate about its longitudinal axis in the link 38A. Connected to the ball end 56 is the clevis 57 by the nut and bolt fastener 58. Integral with the clevis member 57 is the connecting member 60 attached to the female end of the clevis 61. The connecting member 60 is shown threaded, however, alternatives are readily available to those skilled in the art. All it need do is provide freedom of rotation about its axis. The clevis end of 61 is, in turn, connected to a right angle universal block 63 via the nut and bolt fastener 62 while the other end connects to the clevis 35, by another fastener 64. The clevis 35 is attached to the post 23 by bolt 37 all of which allow for freedom of rotation about the respective fasteners. Twister link 55 functions as a universal joint since it has many degrees of freedom as the link rotates through many planes during gear operation.

Figure 5:
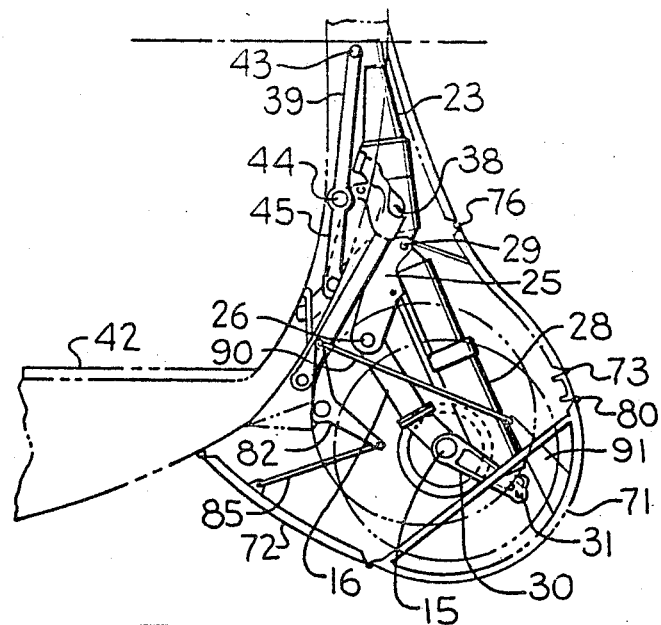
FIG. 5 is an aft looking view of the landing gear in the retracted position showing the pod enclosure.

Now, the main gear actuator 65 is attached to the structure at the cylinder end at 66. The rod end is attached to the trunion collar 32. Actuation of the main gear actuator 65 causes actuation of the over-center lock links actuator 51 as they are hydraulically piped in parallel. Retraction of the actuator 51 causes the over-center lock links 48 to scissor, braking the folding link 45. The main gear actuator 65 then lifts the lower brace 38 rotating the four-bar linkage links 38 and 39 counterclockwise and thereby retracting the main landing gear. Since the twister link 55 is connected to the lower link 38A as well as the clevis 35 on the post 23, retraction of the gear causes the post 23 to rotate about its longitudinal axis, which, in turn, of course, rotates the yoke 25 to which is attached the wheels 12, 13 and 14. The twister link 55 is arranged to rotate the wheels 90° as shown in the full stowed position in FIG. 5. Since the aft post assembly 23 and the forward post assembly 23 are actuated by twister link 55 from opposite sides, the two strut assemblies counter rotate, putting the fore and aft wheels closer together for tighter aircraft turns on the ground while at the same time providing the minimum external stowed length.

Two more mechanical systems, linked to the landing gear for actuation, open and close the upper door 68, the pilot door 70 and the outboard and inboard doors 71 and 72, respectively. As the landing gear extends, it is necessary that the upper door 68 opens during a short period of the gear extension to provide clearance for the gear. The door closes again prior to full extension. Upper door 68 is hinged at 73. The upper door link 74 connects to the door at 75 and to the cross brace 54 of the lower brace 38 at a point hidden in the view of FIG. 3. The pilot door 70 is hinged at the point 76 and has a right angle link extension 77, which is fixed to the door. Link extension 77 is pinned to the pilot door link 78, which is, in turn, pinned to the upper door link 74. The pilot door 70 is open when the landing gear is in the extended position to accommodate the projecting portion of the post 23. It should be reasonably clear that as the lower brace 38 rotates counterclockwise, the link 74 rotates so as to open the upper door 68 and as it continues to rotate counterclockwise, it closes the door 68 as well as the door 70.

The second mechanically actuated door system opens and closes the outboard door 71 hinged at 80 and the inboard door 72, hinged at 81. Both of these doors are mechanically actuated by the bell crank assembly 82 which is pin connected to the structure at 83. Bell crank assembly 82 has a first arm 84 which is pin connected to the inboard door link 85 which is in turn pin connected to the door 72. The second arm 86 of the bell crank 82 is pin connected to the actuation link 87 which is pin connected at the opposite distal end again to the lower brace 38. The third arm 88 of the bell crank assembly 82 is connected to the outboard door link 90 which, in turn, is pin connected to a bracket 91 integrally attached to the outboard door 71. Again, as the lower brace 38 rotates counterclockwise during retraction of the gear, the actuation link 87 is pulled up, rotating the bell crank assembly 82 which closes both doors 71 and 72. As the gear is extended, the lower brace 38 rotates in the clockwise direction to reverse the cycle and open the doors.

The actuating system requires no sequencing because the actuating, twisting, and door operating mechanisms are all linked together mechanically. The overcenter lock links actuator 51 and the main gear actuator 65 are the only two driven actuators and are hydraulically piped in parallel. Because there is no sequencing and everything is mechnically linked together, a reversal of hydraulic flow in mid cycle causes no damage.

It may thus be seen that the landing gear element arrangement, depicted in the preferred embodiment of this invention, serves to solve the indicated problems as well as accomplish the objectives noted. This invention is not limited to the embodiment disclosed above, but all changes and modifications thereof not constituting deviations from the spirit and scope of this invention are intended to be included.

What is claimed is:

1. An aircraft articulated landing gear of the type having a lever trailing the lever hinge axis, comprising:
   a rigid axle beam, generally u-shaped with a thru axle attached at the first end and a second axle attached at the second end of said u-shaped axle beam with said axles axially parallel;
   a pair of wheels attached to said thru axle on either side of said first end of said rigid axle beam and a third wheel attached to said second axle with sufficient spacing between wheels to permit removal of any wheel without first removing another wheel;
   support structure pivotally attached about a pivot axis on said axle beam so that said axles rotate parallel to and about said pivot axis; and
   a shock strut, one end of which is attached to said axle beam near said thru axle and the other end attached to said support structure so that said axles can rotate about said pivot axis by extending and retracting said shock strut.

2. The articulated aircraft landing gear of claim 1 wherein said shock strut is attached to said axle beam at an extension beyond said thru axle, located between said pair of wheels so that said vertical translation of said wheel axles exceeds the stroke of said shock strut.

3. The articulated landing gear of claim 1 further comprising:
   aircraft structure;
   linkage means attached between said aircraft structure and said support structure whereby said landing gear may be retracted and extended.

4. The articulated landing gear of claim 3 wherein said support structure at the point of attachment to said linkage means is a post attached to permit rotation about its longitudinal axis which is oriented perpendicular to said axles and further comprising a twister link, pin attached between said post and said linkage means so as to rotate said post, attached to said support structure whereby said axles and said wheels rotate upon retraction of said landing gear.

5. The articulated landing gear of claim 3 wherein said linkage means comprises:
   a four bar linkage;
   a folding link pinned at either end and pin jointed between said ends located as a diagonal in said four bar linkage;
   means to fold said folding link; and
   means for extending and retracting said articulated landing gear connected between said aircraft structure and said support structure coordinated for actuation with said means to fold said folding link.

6. The articulated landing gear of claim 5 wherein said means to fold said folding link is an over-center down-lock link, pin connected intermediate said ends of said folding link and to said aircraft structure, with a second actuator pin connected between said aircraft structure and intermediate said over center down lock link whereby actuation of said second actuator folds said over center down lock link which in turn folds said folding link permitting retraction of said landing gear.

7. The articulated landing gear of claim 5 wherein said support structure at the point of attachment to said four bar linkage is a post attached to permit rotation about its longitudinal axis which is oriented generally perpendicular to said axles and further comprising a twister link, pin attached between said post and said four bar linkage so as to rotate said post, attached to said support structure, whereby said axles and said wheels rotate upon retraction of said landing gear.

8. The articulated landing gear of claim 6 wherein said support structure at the point of attachment to said four bar linkage is a post attached to permit rotation about its longitudinal axis which is oriented generally perpendicular to said axles and further comprising a twister link, pin attached between said post and said four bar linkage so as to rotate said post, attached to said support structure whereby said axles and said wheels rotate upon retraction of said landing gear.

9. The articulated landing gear of claims 6 or 7 further comprising two doors, hinged supported by said aircraft structure, which open and close upon extension and retraction of said landing gear and mechanism actuation means operated from said four-bar linkage to open and close said doors.

10. An aircraft articulated landing gear comprising:
    a rigid axle beam, generally u-shaped, having a first end terminating in a thru axle so as to accommodate an aircraft wheel on either side and having a second end terminating in a second axle oriented parallel to said thru axle and adapted to receive an aircraft wheel, and spaced from said first end so as to permit removal of any wheel without prior removal of any other wheel;
    a post oriented generally perpendicular to said axles, having a lower end terminating in a yoke which pivotally supports said rigid axle beam about a pivot axis on said axle beam so that said thru axle and said second axles rotate about and parallel to said pivot axis;
    a shock strut attached between said post and said first end of said axle beam so that said axles can rotate about said pivot axis by extending and retracting said shock strut;

means to support said post so that said post is free to rotate about its longitudinal axis;

first linkage means to attach said means to support said post to said aircraft for extension and retraction;

second linkage means to rotate said post so that said axle beam rotates with extension and retraction; and means to lock said first linkage means in the extend position.

11. The aircraft articulated landing gear of claim 10 wherein said first linkage means to attach said means to support said post to said aircraft for extension and retraction is a four-bar linkage.

12. The aircraft articulated landing gear of claim 11 wherein said second linkage means to rotate said post is a twister link pin attached between said post and said four-bar linkage so as to rotate said post.

13. The aircraft articulated landing gear of claim 11 wherein said means to lock said first linkage means in the extend position is folding link pinned at either end and pin jointed between said ends located as a diagonal in said four-bar linkage and means to fold said fold link and further comprising means for extending and retracting said articulated landing gear connected between said aircraft structure and said post coordinated for actuation with said means to fold said folding link.

* * * * *